Figure 1:
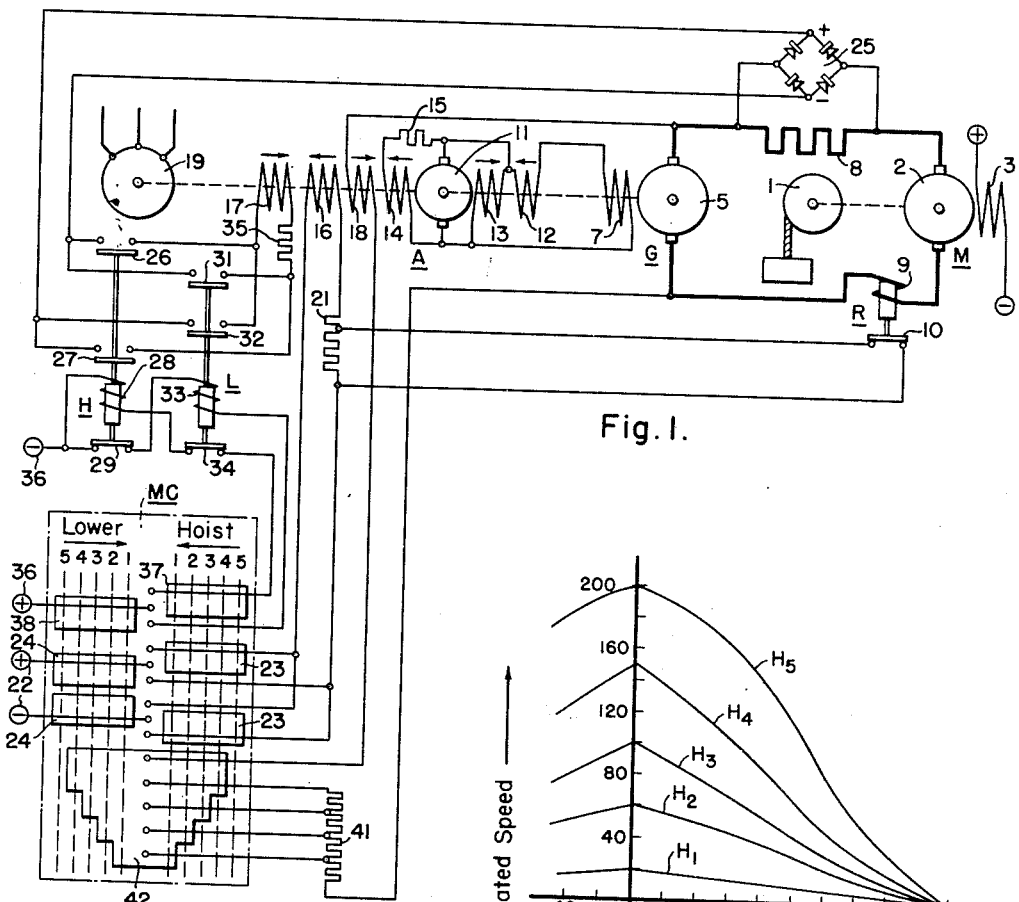

July 13, 1954 G. E. MATHIAS ET AL 2,683,842
VARIABLE VOLTAGE DRIVE FOR HOISTS OR THE LIKE
Filed July 7, 1950

WITNESSES:
Robert C. Baird
Wm. C. Groome

INVENTORS
Gerald E. Mathias &
William T. Hunt, Jr.
BY
C. M. Aury
ATTORNEY

Patented July 13, 1954

2,683,842

UNITED STATES PATENT OFFICE 2,683,842

VARIABLE VOLTAGE DRIVE FOR HOISTS OR THE LIKE

Gerald E. Mathias and William T. Hunt, Jr., Williamsville, N. Y., assignors to Westinghouse Electric Corporation, East Pittsburgh, Pa., a corporation of Pennsylvania Application July 7, 1950, Serial No. 172,526

2 Claims. (Cl. 318—143)

Figure 2:
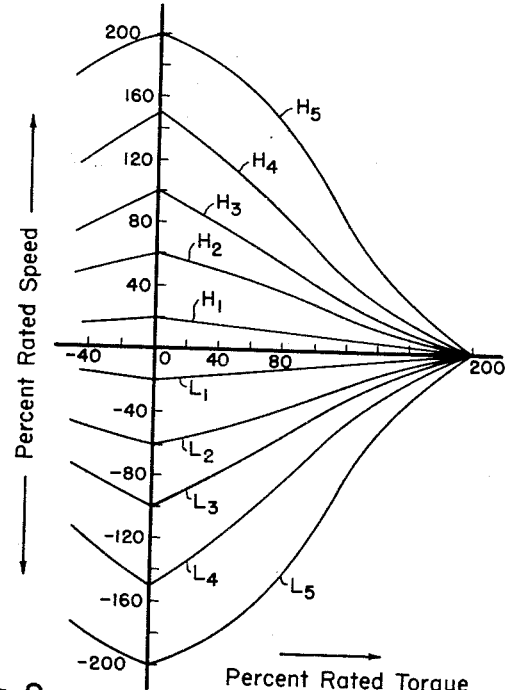

Our invention relates to direct-current variable voltage drives for hoists and other applications involving motoring as well as overhauling loads and is disclosed in the following with reference to the drawing, in which:

Figure 1 shows by way of example a schematic circuit diagram of a hoist drive according to the invention, while Fig. 2 is a typical speed torque characteristic obtainable with such drives.

Speed torque characteristics of the general type exemplified by Fig. 2, being approximately symmetrical for hoisting and lowering, or motoring and overhauling, have since long been recognized as desirable for many applications such as heavy-duty crane operations.

Various systems have been developed and are known for securing such speed torque requirements. Some of the known systems require an especially designed exciter for the main generator of the drive, others necessitate the addition of a current limit generator to the set of generators otherwise needed, and still others are rather intricate and less suited for heavy-duty performance.

It is an object of our invention to provide a variable voltage drive capable of the above-mentioned performance which combines a comparatively simple and highly reliable design with suitability for high-duty performance, such as required for instance on gantry cranes.

To this end, we excite the field of the main generator of the drive directly from an amplifying generator which is controlled by a pattern field winding of normally constant excitation, a current field winding and a voltage field winding both differentially related to the pattern field winding. The current field winding is connected with the common armature circuit of the drive motor and main generator so that this field winding responds to the load current of the motor. The voltage field winding is connected across the just-mentioned armature circuit of the drive and excited in accordance with the voltage applied to the drive motor. However, the field circuit of the voltage field winding includes a selectively adjustable resistance means which is subject to control by the operator and is set in accordance with the desired speed torque characteristic.

According to another feature of the invention, the current field winding is rated for an excitation which balances that of the pattern field winding at a given torque value above 100% rated torque of the drive motor so that any selected speed torque characteristic reaches a stall point at the predetermined value, for instance of 200% rated torque.

According to still another feature which is desirable for some applications, the armature circuit of the drive is equipped with a load-responsive relay which is actuated at a given torque value above 100% but below the above-mentioned given stall point value. This relay is connected with the circuit of the pattern field winding to insert resistance into that circuit, thus reducing the pattern field excitation when the load current exceeds the response value of the relay.

The amplifying generator to be used in drive systems according to the invention may be of any suitable type. For instance an armature-reaction excited generator may be used for this purpose. Coil excited amplifying generators are also applicable, and an example of the latter type will be referred to in the following.

The foregoing and more specific features of the invention will be apparent from the following description of the illustrated embodiment.

According to Fig. 1, the hoist drum 1 of a crane is driven from a direct-current motor M whose armature is denoted by 2. The motor has a separately excited field winding 3 which receives constant excitation from direct-current terminals. The motor armature 2 is connected to the armature 5 of a main generator G with a separately excited main field winding 7. The common armature circuit of motor M and generator G includes a series resistor 8 and the coil 9 of an auxiliary load relay whose contact 10 is normally closed. Coil 9 opens the contact 10 only when the load current exceeds a certain value, corresponding for instance to about 150% rated torque.

The main field winding 7 of generator G receives excitation from the armature 11 of an amplifying generator A. This generator is equipped with self-exciting winding means which include a main self-excitation winding 12 series connected between field winding 7 and armature 11. Winding 12 is rated to provide most of the field excitation needed in generator A for maintaining the voltage across field winding 12 at any given value within the available range. The amount of amplifying generator excitation due to field winding 12 may be about 70% of the total excitation needed. Connected across the amplifying generator armature 11 is a differential self-excitation winding 13. Another cumulatively acting self-excitation winding 14 is series connected with a calibrating resistor 15 across the same armature. The windings 13 and 14 approximately balance each other and have the effect of providing an automatic temperature compensation so that the total amount of self-excitation of the amplifying generator remains at the desired percentage regardless of changes in temperature.

The control proper of the amplifying generator is effected by means of a pattern field winding 16, a current field winding 17 and a voltage field winding 18. Relative to the pattern field winding 16, both the current field winding and the voltage field winding act differentially. The armatures 5 and 11 are shown to be driven by a constant speed motor 19, although separate auxiliary drives may be used if desired.

The circuit of the pattern field winding 16 includes a series resistor 21 the major portion of which is normally shorted by the above-mentioned contact 10 of the load relay R and is excited from constant voltage terminals 22 through the contacts 23 or 24 of a master control switch MC. The master controller has an off position and five selective positions for each direction of operation. It will be recognized that the pattern field winding 16 is deenergized when the master controller MC is in the illustrated off position and receives constant excitation whenever the master controller is moved to any of its operative points in the hoisting or lowering direction. However, the master controller acts as a reversing switch so that the excitation of the pattern field has one direction for hoisting and the opposed direction for lowering. The magnitude of the pattern excitation is changed only when the load relay R responds.

The above-mentioned series resistor 8 in the armature circuit of the drive serves as a means for providing a voltage drop proportional to the load current. It will be understood that, if desired, one or both of the commutating field windings (not shown) of the motor or the generator may be used for this purpose alone or together with a series resistor. Connected across the resistor 8 is a rectifier 25 so that across the output terminals of this rectifier a current measuring voltage is available whose polarity is independent of the direction of current flow in the armature circuit. The current field winding 17 is connected across the rectifier output terminals through the main contacts 26 and 27 of a hoist contactor H whose coil 28 also controls an interlock contact 29. Also connected in the circuit of the current field winding are the main contacts 31 and 32 of a lowering contactor L whose control coil 33 also actuates an interlock contact 34. Series connected in the current field circuit is further a calibrating resistor 35. The circuits of coils 28 and 33 receive excitation from constant voltage terminals 36 under control by contacts 37 and 38 of the master controller MC. In the illustrated off position, both coil circuits are open so that the current field circuit is interrupted.

When the master controller is placed in any of its hoist positions, the coil circuit of contactor H is excited and closes contacts 26 and 27. When the master controller MC is placed in any of its lowering positions, the coil circuit of contactor L is excited so that contacts 31 and 32 are closed. In this manner, the contactors, together with the master controller, operate as a reversing switch to apply to the current field 17 the direction of excitation needed for the selected hoisting or lowering operation.

The voltage field winding 18 is connected across the armature circuit of the drive and hence is energized in accordance with the voltage impressed on the drive motor. However, the voltage field circuit is equipped with a selectively adjustable series resistor 41 which has a number of taps controlled by contact means 42 of the master controller MC. In the illustrated off position as well as in first position hoist or first position lowering, a minimum portion of resistor 41 is effective in the voltage field circuit. When the master controller is advanced to second, third and further positions hoisting or lowering, an increasing portion of resistor 41 is inserted into the voltage field circuit so that a progressively decreasing proportion of the motor voltage is applied to the voltage field winding. At the fifth point hoisting or lowering, the circuit of the voltage field winding is completely interrupted.

As mentioned, the self-energizing field excitation of the amplifying generator A supplies 70% of the ampere turns required in this generator. The pattern field winding 16 is rated to supply the remaining 30% of required field excitation. The current field winding 17 and its circuit are adjusted to balance the pattern field winding when 200% rated current flows in the motor armature circuit.

For an understanding of the operation of the system, let us first consider the conditions existing when the master controller is placed on the fifth point hoist and the drive is accelerating from standstill. Then the differential voltage field 18 is disconnected and the pattern field 16 is substantially the only control field at first effective in the amplifying generator. The pattern field is energized for 30% of the ampere turns required in the generator A, so that the output voltage of generator A and the field excitation of the main generator G rise accordingly. As the current generated in armature 11 and applied to the field winding 7 builds up, the self-energizing field of the amplifying generator supplies additional ampere turns so that the output voltage of the amplifier generator and the voltage of the main generator G increase slowly to the final value that corresponds to no-load speed conditions. If load is applied to the motor M, the ampere turns in the current field winding 17 of the amplifying generator oppose the ampere turns in the pattern field winding 16 and thus reduce the voltage of the amplifying generator A and hence that of the main generator G.

When the master switch is placed to any of its other points hoist, the differential voltage field winding 18 is connected across the armature circuit of the drive. This voltage field winding produces ampere turns that oppose those of the pattern field winding 16 and thus determine the no-load speed points. When load is applied, the ampere turns of the current field winding 17 increase, thus decreasing the ampere output voltage. As the voltage of the main generator G decreases accordingly, the ampere turns provided by the differential voltage field winding 18 are reduced so that the stall point remains at 200% rated current for all master switch positions. The family of hoist characteristics thus obtained in the respective hoist conditions of the master controller MC are represented in Fig. 2 by curves $H_1$ to $H_5$, respectively.

For operation in the lowering direction, the pattern field is reversed and the current field is also reversed. The operation is similar to that in the hoisting direction. Satisfactory performance to overhauling conditions necessitates slow changes in main generator voltage. The current feedback from the armature circuit of the drive to the current field winding 17 is now in a regenerative sense so that the changes in generator voltage must be slow enough to permit the motor speed to follow the main generator voltage without requiring very much accelerating current. The lowering characteristics corresponding to the five respective controller positions are exemplified in Fig. 2 by curves $L_1$ to $L_5$.

The load responsive relay R adds a safety factor to the system which is desirable for many heavy-duty requirements. The operation of such a relay of course modifies the characteristics of Fig. 2.

It will be understood by those skilled in the art that a system according to the invention can be modified in various respects, especially as regards the design and interconnection of the reversing switch or contactor means and other auxiliary control components without departing from the advantages and features of the invention and within the scope of the claims annexed hereto.

We claim as our invention:

1. A variable-voltage drive, comprising a direct-current motor and a main generator having an armature circuit in common, said main generator having a field winding, an amplifying generator having an armature connected with said main generator field winding and having a pattern field winding and a current field winding and a voltage field winding, current supply means of normally constant voltage connected with said pattern field winding, said current field winding being differential relative to said pattern field winding and being connected with said armature circuit to be excited in accordance with the motor load current, said voltage field winding being differential relative to said pattern field winding and having a field circuit connected across said armature circuit and comprising series resistor means, a selectively adjustable reversing switch having a plurality of positions for both adjustment directions respectively, said switch having reversing contact means connected with said pattern field winding and having reversing contact means connected with said current field winding to reverse the current field excitation together with the pattern field excitation, and said switch having selector contact means connected with said series resistor means for setting the voltage-responsive excitation of said voltage field winding in accordance with a selected speed-torque characteristic of said motor.

2. A variable-voltage drive, comprising a direct-current motor and a main generator having an armature circuit in common, said main generator having a field winding, an amplifying generator having an armature connected with said main generator field winding and having a pattern field winding and a current field winding and a voltage field winding and self-excited winding means, said self-excited winding means being connected with said armature and having a major percentage of the ampere turns needed for the normal field excitation of said amplifying generator, current supply means of normally constant voltage connected with said pattern field winding, said pattern field winding having the remaining percentage of ampere turns needed for said field excitation, said current field winding being connected with said armature circuit to be excited in accordance with the motor load current and being balanced against said pattern field winding at a given torque value above 100% rated torque, said voltage field winding being differential relative to said pattern field winding and having a field circuit connected across said armature circuit to be excited in accordance with the voltage of said armature circuit, said field circuit having selectively adjustable resistance means for setting the voltage-responsive excitation of said voltage field winding in accordance with a selected speed-torque characteristic of said motor, said self-exciting field winding means comprising a main self-excitation winding series-connected in said armature circuit and cumulative to said pattern field winding, and two temperature-compensating self-excitation windings shunt-connected to said armature in mutually opposing relation.

References Cited in the file of this patent

UNITED STATES PATENTS

| Number | Name | Date |
|---|---|---|
| 2,255,064 | King | Sept. 9, 1941 |
| 2,301,689 | Edwards et al. | Nov. 10, 1942 |
| 2,318,043 | Austin | May 4, 1943 |
| 2,367,956 | Mahnke | Jan. 23, 1945 |
| 2,482,484 | Hornbarger et al. | Sept. 20, 1949 |
| 2,510,637 | King et al. | June 6, 1950 |